United States Patent

Murata et al.

[11] Patent Number: 5,130,786
[45] Date of Patent: Jul. 14, 1992

[54] COLOR IMAGE COMPRESSION PROCESSING WITH COMPENSATION

[75] Inventors: Richard Y. Murata; Harry S. Pyle, both of San Antonio

[73] Assignee: Image Data Corporation, San Antonio, Tex.

[21] Appl. No.: 406,088

[22] Filed: Sep. 12, 1989

[51] Int. Cl.$^5$ .............................................. H04N 9/64
[52] U.S. Cl. ..................... 358/21 R; 358/13
[58] Field of Search .................. 358/75, 78, 13, 21

[56] References Cited

U.S. PATENT DOCUMENTS

| | | |
|---|---|---|
| 3,773,971 | 11/1973 | Sainte-Beuve . |
| 3,778,543 | 12/1973 | Lowry . |
| 3,803,348 | 4/1974 | Limb . |
| 4,023,199 | 5/1977 | Netravali et al. . |
| 4,245,239 | 1/1981 | Richman . |
| 4,319,267 | 3/1982 | Mitsuya et al. . |
| 4,355,326 | 10/1982 | Lee . |
| 4,584,597 | 4/1986 | Guichard . |
| 4,597,005 | 6/1986 | Baleshta et al. . |
| 4,672,424 | 6/1987 | Lechner . |
| 4,703,350 | 10/1987 | Hinman . |
| 4,743,959 | 5/1988 | Frederiksen . |
| 4,812,903 | 3/1989 | Wagensonner ............ 358/75 |

Primary Examiner—James J. Groody
Assistant Examiner—David E. Harvey
Attorney, Agent, or Firm—Baker & Botts

[57] ABSTRACT

A method of color image compression processing provides compensation for lossy luminance compression (30) by adjusting (34) the red and blue color components using a lossy luminance compression factor equal to the difference between compressed and decompressed luminance. The compensated color components are then used to compute (42) chrominance color differences. Chrominance is range compressed (44) by bit-reduction using a non-linear range compression function that minimizes compression for small chrominance magnitudes, where the eye is more sensitive to a loss of color fidelity, while maximizing compression in the color saturation regions where the eye is less sensitive. After luminance and chrominance decompression (60) and reconversion to the RBG color components (70), compensation for red and blue color shift (such as due to round-off errors) is accomplished by multiplying (80) the green component (which is calculated from the color-shifted red and blue components) by a color shift compensation factor that shifts green in the opposite direction from the shift in the red and blue components.

50 Claims, 3 Drawing Sheets

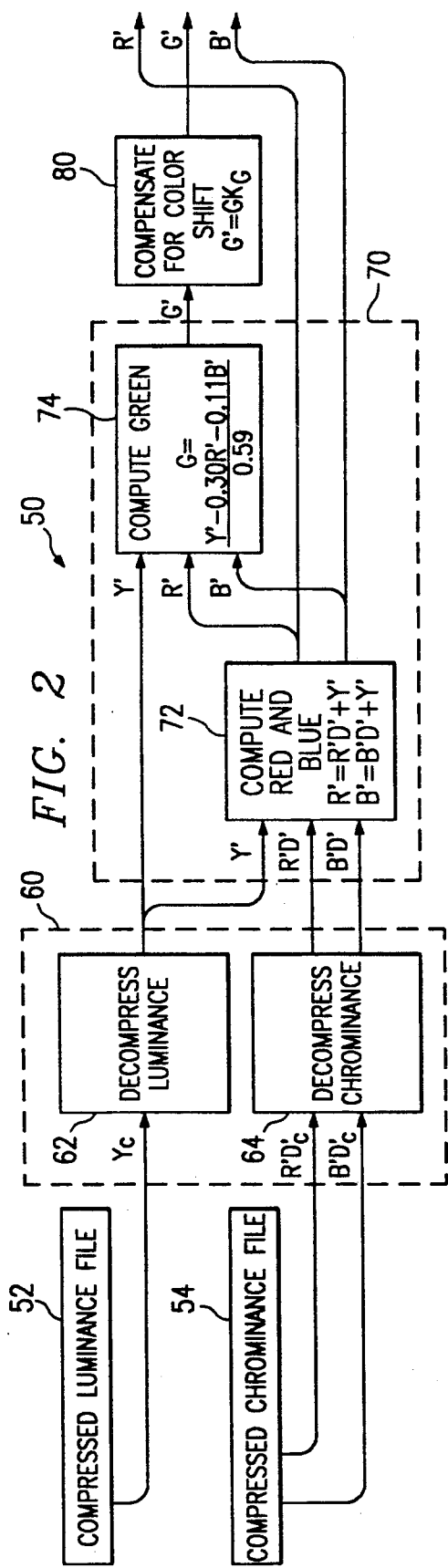
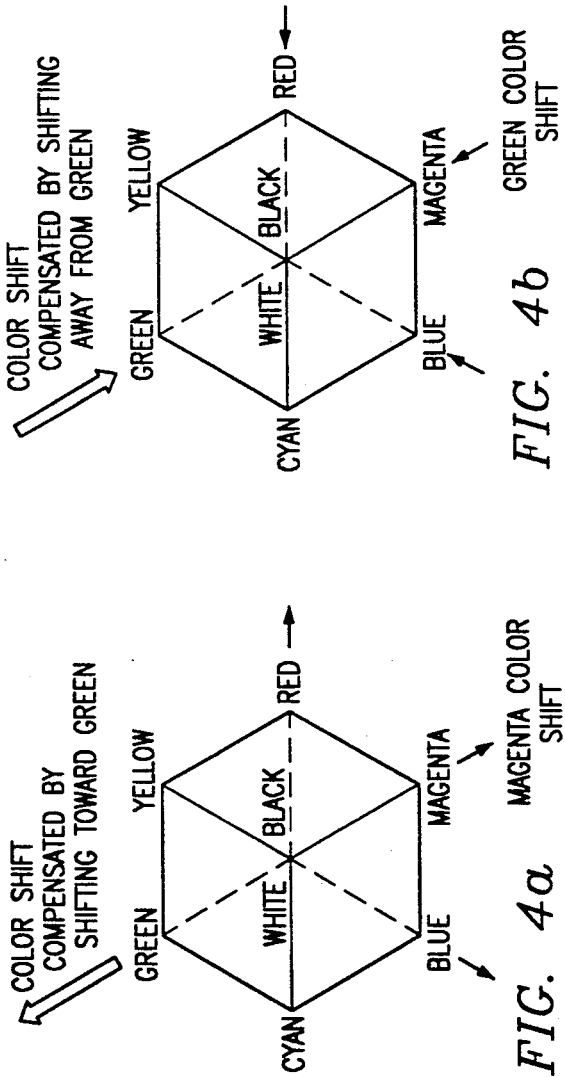
FIG. 2
FIG. 4a
FIG. 4b

COLOR IMAGE COMPRESSION PROCESSING WITH COMPENSATION

TECHNICAL FIELD OF THE INVENTION

This invention relates to color image processing, and more particularly relates to nonlinear range compression for chrominance data, with compensation for lossy luminance compression and for color shift due to compression round-off.

BACKGROUND OF THE INVENTION

As the resolution of color imaging systems increases, the amount of data that must be processed to display and communicate these images also increases. Typically, to reduce data storage requirements and to improve data transmission rates, color images are compressed using a number of either proprietary or non-proprietary compression algorithms.

Typically, color images are defined by RGB (red/green/blue) color components, and the RGB information is converted to luminance (gray-scale) and chrominance (color) components. The almost universal standard for luminance and chrominance conversion is that adopted by the NTSC (National Television Standards Committee) for the color television broadcast industry. In accordance with the NTSC standard, the RGB (red/green/blue) color components of the picture are encoded into a single luminance component Y and two chrominance components I and Q:

$$Y = 0.30R + 0.59G + 0.11B$$

$$I = 0.74(R-Y) - 0.27(B-Y)$$

$$Q = 0.48(R-Y) + 0.41(B-Y)$$

The chrominance components are commonly also referred to as color differences. The RGB color components that form a YIQ-encoded color image are recovered by decoding luminance and chrominance signals:

$$R = 0.62Q + 0.96I + Y$$

$$B = 1.70Q - 1.10I + Y$$

$$G = (Y - 0.30R - 0.11B)/0.59$$

For NTSC-standard color broadcast communications, color image compression is concentrated on the chrominance information, because the eye is relatively insensitive to reductions in chrominance information. Thus, the standard 6 MHz color television broadcast bandwidth is divided:

Y = 4.5 MHz
I = 1.5 MHz
Q = 0.5 MHz

Chrominance compression is accomplished by averaging or eliminating the chrominance information associated with neighboring pixels, thus reducing the amount of bandwidth required to represent the original chrominance information for a color image.

In digital color image processing, each RGB color component is represented by a color magnitude—the conventional 8 bit format provides 256 color magnitude values. Encoding the RGB data bytes into luminance and chrominance data yields corresponding luminance magnitude bytes (e.g., 8 bits providing 256 magnitude values) and signed chrominance or color difference bytes (e.g., 8 bits magnitude and 1 sign bit).

Digital color image processors typically range compress chrominance (color difference) data by applying a linear range compression function that reduces the number of magnitude bits by at least one to accommodate the sign bit. For the conventional 8 bit format, the 7-bit magnitude provides 128 possible chrominance magnitude values (for a total chrominance range of +/−128 or 256).

Two different linear range compression schemes are currently used. In one scheme, illustrated in FIG. 3a, the full range of possible chrominance magnitudes is identically compressed into the desired number of compressed chrominance magnitudes. For example, to range compress an 8-bit magnitude to 7-bits, each range compressed chrominance magnitude must represent 2 actual chrominance magnitudes. The disadvantage of this linear range compression function is that compression occurs across the full range of chrominance magnitudes. However, the eye is much more sensitive to a loss of color fidelity in the region of subtle color shifts (i.e., small chrominance magnitudes), than in the region of saturated colors (i.e., large chrominance magnitudes).

To avoid the loss of color fidelity for subtle color shifts, a second linear range compression scheme, illustrated in FIG. 3b, has been used. In this scheme, chrominance magnitudes are uncompressed, and actual chrominance magnitudes that exceed the range compressed maximum magnitude are all assigned that maximum value. Thus, for an 8-bit format, the relationship between actual and compressed chrominance magnitudes is one-to-one up to the 7-bit maximum of 128, with all actual chrominance magnitudes from 128 to 256 being assigned to the maximum value. This linear range compression scheme preserves color fidelity in the range of subtle color shifts (small chrominance magnitudes), but is unable to maintain color fidelity in the saturated region.

In addition to chrominance range compression, both luminance and chrominance data are typically further compressed using conventional compression algorithms (which may be the same or different for luminance and chrominance). These conventional algorithms are either lossless (information preserving) or lossy (non-information preserving). Higher compression ratios are generally obtained using the lossy compression algorithms (such as Discrete Cosine Transform), which sacrifice a measure of accuracy in the original color image to improve the compression ratio. These lossy compression algorithms reduce the quantity of color image data required to be stored and/or transmitted from 2 to 1 to upwards of 30 to 1.

Lossy compression schemes with high compression ratios result in visible image degradation. When compressing gray-scale (monochrome) images, the image degradation appears as a loss of detail (blurring) and noise, both of which are often acceptable in view of the trade-off between image accuracy and compression ratios. However, when compressing color images, image degradation also extends into the color domain. Such degradation is particularly evident because it is nonuniform, causing the decompressed color images to appear mottled even when compressed at moderate compression ratios. For a given compression ratio, color image degradation resulting from lossy luminance compression is significantly greater than color image degradation from lossy chrominance compression, because the greatest amount of picture information is in luminance.

While the color information lost from lossy luminance compression can be corrected, schemes to recover all luminance information are computationally costly. These luminance correction schemes typically require specialized hardware (for example, a digital signal processor) to achieve adequate throughput.

Color image degradation also results from color shifts (changes in hue) caused by mathematical round-off errors and other image processing functions. Round-off errors can result from any of a number of color image processing operations, including RGB-to-luminance conversion, lossy luminance compression, chrominance computation, and chrominance compression. Round-off errors typically occur consistently throughout an entire image, resulting in an overall shift in the hue of the color image. This shift in hue is particularly apparent on objects that were colorless prior to compression.

Accordingly, a need exists for a color image processing method that uses a chrominance range compression function that accurately preserves small color difference magnitudes that result in subtle color shifts, while also preserving some color difference differentiation in the regions of saturated colors. A satisfactory color image processing method would include compensation for both lossy luminance compression and overall color shift (change in hue) such as caused by mathematical round-off errors during image processing.

SUMMARY OF THE INVENTION

The present invention accomplishes chrominance (color difference) range compression according to a non-linear range compression function that avoids (or minimizes) compression for subtle color shifts (small color difference magnitudes), while gradually increasing compression to preserve some color difference differentiation in the regions of color saturation (large color difference magnitude). Compensation can be provided for image degradation resulting from lossy luminance compression by adjusting appropriate color components prior to computing chrominance color differences, and from overall color shift (such as caused by round-off errors) by adjusting a complementary color component after chrominance decompression.

In one aspect of the invention, the color image processing method converts the color component data that forms a color image into corresponding luminance and chrominance data. The chrominance data bytes are range compressed by bit-reduction according to a non-linear range compression function in which compression is a minimum for small chrominance magnitudes and increases to a maximum for large chrominance magnitudes. The recommended non-linear range compression function is the sum of a geometrical progression:

$$m_C = \left[\frac{r^m - 1}{r - 1}\right] S$$

where m is actual chrominance magnitude (e.g., 0-255), r is a range compression factor less than one and greater than zero, S is a compression/expansion factor, and $m_c$ is the resulting compressed chrominance magnitude rounded to the nearest integer (e.g., 0-127). For typical magnitude ranges, the range compression factor r will be near one.

In a second aspect of the invention, for applications where lossy luminance compression is used, compensation is provided for the resulting color information loss by adjusting the color components used to derive the chrominance color differences. A lossy luminance compression compensation function uses a luminance error factor corresponding to the difference between uncompressed and decompressed luminance.

In a third aspect of the invention, compensation for substantially uniform color shifts introduced during image processing is provided during decompression by adjusting the complementary color component that is derived from the color components computed from the decompressed chrominance and luminance. The color shift compensation function uses a color shift factor to obtain the compensated complementary color component, such that a compensating adjustment in that complimentary color component correspondingly compensates for the shift in the other color components.

In a preferred embodiment of the invention, the color image processing method converts RGB data to luminance according to the NTSC standard ($Y = 0.30R + 0.59G + 0.11B$) using an 8-bit format to provide a range of 256 (0-255) luminance magnitude values. The luminance data are then compressed using a moderate-to-high ratio lossy compression algorithm, and the compressed luminance $Y_C$ is stored in a compressed luminance data file.

To compensate for color information lost as a consequence of lossy luminance compression, the R and B color components used to generate the chrominance color differences are compensated according to a lossy luminance compression function:

$$R' = \max[\min[R + d(Y' - Y), 255], 0]$$

$$B' = \max[\min[B + d(Y' - Y), 255], 0]$$

where R' and B' are the compensated color component magnitudes adjusted using a luminance error factor (Y' − Y) in which Y' is the decompressed luminance.

Chrominance is generated by computing the color differences:

$$R'D = R' - Y$$

$$B'D = B' - Y$$

from the compensated color components R' and B'. These chrominance color differences, which have maximum magnitudes of 179 for R'D and 227 for B'D, are range limited to 127 in accordance with the 8-bit format (7 magnitude bits and 1 sign bit) using the recommended non-linear chrominance range compression function with a range compression factor of 0.99435.

The non-linear chrominance range compression function is performed by a table look-up operation in which all possible compressed chrominance (color difference) values (+ and −) are stored in a table. Two alternative table look-up schemes can be used: (a) a single table used for both R'D and B'D that contains compressed chrominance values computed for the blue color component which has the largest range (227) of actual chrominance magnitudes; and (b) separate tables for R'D and B'D that contain compressed chrominance values computed for the corresponding range of chrominance magnitudes.

The non-linear chrominance range compression function provides zero compression for small color difference magnitudes, maximizing color fidelity for subtle color shifts. Compression gradually increases to a maximum for large color difference magnitudes, preserving some amount of color-shift differentiation in the regions of color saturation. The range-compressed chrominance data R'D' and B'D' are then compressed using a conventional moderate-to-high ratio lossy compression algorithm, and the compressed values $R'D'_C$ and $B'D'_C$ are stored in a compressed chrominance file.

The color image is recovered from the compressed luminance and chrominance by decompressing the compressed luminance $Y_C$ and the compressed chrominance $R'D'_C$ and $B'D'_C$. To compensate for substantially uniform color shift that results primarily from mathematical round-off errors during image processing, the complementary green color component, which is computed from the red and blue color components used to derive the chrominance color differences, is adjusted to compensate for these changes in hue. First, the red and blue color components are recovered from the decompressed chrominance and decompressed luminance according to:

$$R' = R'D' + Y$$

$$B' = B'D' + Y$$

and the uncompressed green color component is computed from these color components and the luminance according to:

$$G = \frac{Y - 0.30R - 0.11B}{0.59}$$

Color shift compensation is accomplished by computing a compensated green component according to:

$$G' = GK_G$$

where $K_G$ is a color-shift factor that can be set empirically for the compression algorithm being used (typically within a few percent of 1).

The recovered, compensated R'G'B' color component signals are then available for generating the color image.

The features and advantages of the invention include the following. A non-linear chrominance (color difference) compression technique avoids (or minimizes) compression in the range of small color difference magnitudes by increasing compression in the range of large color difference magnitudes. By minimizing compression for small color difference magnitudes, the technique preserves subtle color shifts where the eye is most sensitive to a loss in color fidelity. By gradually increasing range compression outside the range of small color difference magnitudes, the technique concentrates range compression in the regions of color saturation (where the eye is less sensitive to a loss of color information) while still preserving some amount of color-shift differentiation. The non-linear range compression technique is adaptable to any color image encoding/decoding system in which component color information is encoded into luminance and chrominance information.

The non-linear range compression function can be performed as a direct computation, or implemented as a table look-up operation. Table look-up can be implemented either with a single table corresponding to the maximum range of color difference values, which conserves memory, or with a separate table for each chrominance component, which maximizes color fidelity.

A lossy luminance compression compensation technique compensates only the red and blue components used to derive chrominance color differences, making non-linear range compression more accurate, and minimizing color image degradation, in a computationally efficient manner.

A color shift compensation technique compensates for overall color shift resulting from image processing functions (such as round-off) that cause substantially uniform color information degradation, adjusting the complementary green color component (which is computed from the red and blue color components) after luminance/chrominance decompression.

For a more complete understanding of this invention, and for further features and advantages, reference is now made to the following Detailed Description, taken in conjunction with the accompanying Drawings. Although the Detailed Description, and accompanying Drawings, are with respect to a specific, preferred embodiment, those skilled in the art will recognize various changes and modifications, and it is intended that the present invention encompass such changes and modifications as fall within the scope of the appended claims.

BRIEF DESCRIPTION OF THE DRAWINGS

FIG. 2 is a data flow diagram of the image decompression procedure of the color image processing method, including color shift compensation;

FIGS. 4a and 4b are color cube diagrams illustrating color shift compensation.

DETAILED DESCRIPTION OF THE INVENTION

The Detailed Description of the preferred embodiment of the color image processing method of this invention is organized as follows:
1. Image Compression
2. Image Decompression
3. Non-Linear Chrominance Range Compression
4. Lossy Luminance Compression Compensation
5. Color Shift Compensation
6. Conclusion The preferred embodiment is described in connection with a color image processing system in which pixel color output is determined by associated RGB (red/green/blue) color component magnitudes. For color image processing, including storage and/or transmission, the color images are converted into luminance and red/blue chrominance color differences given by:

$$Y = 0.30R + 0.59G + 0.11B$$

$$RD = R - Y$$

$$BD = B - Y$$

The formula for luminance is the standard, while the chrominance color differences RD and BD differ from NTSC I and Q. Those skilled in the art recognize that this invention is routinely adaptable to other luminance/chrominance color image color coordinate systems, including those using different color components (such as cyan, magenta and yellow).

Figure 1:
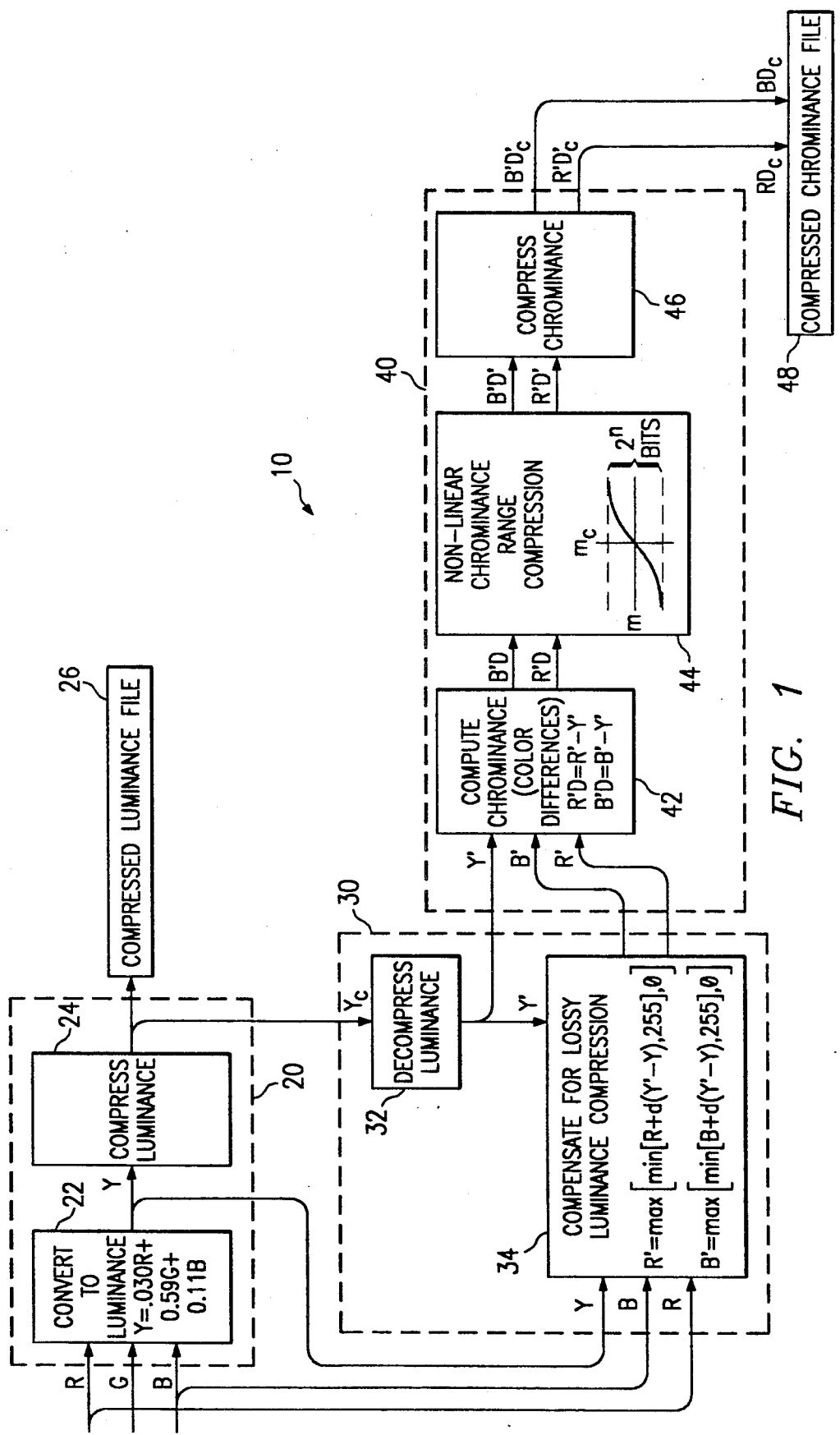
FIG. 1 is a data flow diagram of the image compression procedure of the color image processing method of this invention, including non-linear chrominance range compression and compensation for lossy luminance compression.

1. Image Compression. FIG. 1 is a data flow diagram for the image compression procedure of the color image processing method of this invention. Image compression 10 involves three principle operations—luminance compression 20, lossy luminance compression compensation 30, and chrominance compression 40, including non-linear range compression 44.

A color image is received as a series of RGB color component magnitude bytes for each pixel of an image frame. For this Detailed Description, an 8-bit format is assumed, i.e., each RGB color component magnitude byte is 8 bits, providing 256 possible color component magnitude values (0-255). The use of the "byte" terminology is for convenience of discussion—assembling data into 24-bit pixels with three 8-bit color component fields and other data formatting conventions may be used. The generation of the digital RGB color component data may be accomplished conventionally, and forms no part of this invention.

For the luminance compression operation 20, the RGB color component data is converted (22) to luminance in accordance with the NTSC standard:

$$Y = 0.30R + 0.59G + 0.11B$$

While this luminance conversion function can be accomplished by direct computation, the recommended approach is to use a look-up table operation.

The luminance Y data bytes (8 bits magnitude) are then compressed (24) using a selected compression algorithm This compression algorithm may be conventional (either proprietary or nonproprietary), and its specification and/or operation forms no part of this invention. While a lossless (information preserving) compression algorithm may be used, for a preferred embodiment the image compression procedure uses a lossy luminance compression compensation operation that compensates for color degradation that would otherwise result from lossy luminance compression. Accordingly, to obtain higher compression ratios, the recommended approach to luminance compression is to use a lossy compression algorithm offering a medium-to-high compression ratio.

The resulting compressed luminance $Y_C$ data is placed in a compressed luminance file 26, for storage and/or transmission.

The lossy luminance compression compensation operation 30 operates on the R and B color components used in the chrominance compression operation 40 to compute chrominance color differences. The compressed luminance $Y_C$ data is first decompressed (32) to provide decompressed luminance data Y' that is different from the actual luminance Y derived from the RGB color component data because of the lossy compression algorithm used to compress luminance. Compensated R and B color components are then computed (34) using a luminance error factor.

$$R' = \max [\min [R + d(Y' - Y), 255], 0]$$

$$B' = \max [\min [B + d(Y' - Y), 255], 0]$$

where (Y' − Y) is the luminance error factor used to adjust the R and B color components and obtain compensated color components R' and B' (See Section 4).

The chrominance compression operation 40 uses the compensated R' and B' color components, and the decompressed luminance Y', to compute (42) the chrominance color differences R'D and B'D:

$$R'D = R' - Y'$$

$$B'D = B' - Y'$$

The color differences R'D and B'D are signed, and require 8-bits to fully represent the range of color difference magnitude values (179 for R'D and 227 for B'D). Thus, for an 8-bit format, the corresponding range for the color difference magnitudes must be limited to 7 bits (maximum value 128) through range compressing bit reduction. (See Section 3).

To achieve the necessary bit-reduction for the chrominance magnitudes, the computed color difference data R'D and B'D are range compressed (44) according to a non-linear chrominance range compression function:

$$\frac{r^m - 1}{r - 1}$$

where m is an actual color difference magnitude (R'D' or B'D), r is a range compression factor near but less than 1, and $m_C$ is the resultant compressed color difference magnitude. This non-linear chrominance range compression function is the sum of a geometrical progression that provides minimal compression for small color difference magnitudes, with compression gradually increasing to a maximum for large color difference magnitudes. (See Section 3 and FIG. 3c)

The resulting range-compressed chrominance color differences R'D' and B'D' are then compressed (46) using a selected compression algorithm. As with luminance compression (24), this chrominance compression algorithm may be conventional (either proprietary or non-proprietary), and its specification and/or operation forms no part of this invention. The recommended approach is to use the same compression algorithm for both luminance and chrominance.

The compressed chrominance data $R'D'_C$ and $B'D'_C$ are input to a compressed chrominance file 48 for storage and/or transmission.

2. Image Decompression. FIG. 2 is a data flow diagram for the image decompression procedure of the color image processing method of this invention. Image decompression 50 involves a decompression operation 60, an RGB computation operation 70, and a color shift compensation operation 80.

Compressed luminance data $Y_C$ and compressed chrominance (color difference) data $R'D'_C$ and $B'D'_C$ are retrieved from respective compressed luminance and chrominance files 52 and 54. In the decompression operation 60, the compressed luminance data $Y_C$ and the compressed chrominance data $R'D'_C$ and $B'D'_C$ are decompressed (62 and 64) in accordance with the corresponding compression algorithms, yielding decompressed luminance data Y' and decompressed chrominance data R'D' and B'D'.

In the RGB computation operation 70, the decompressed luminance and chrominance (color differences)

are first used to compute (72) the red and blue color components in accordance with the color difference relationships:

$$R' = R'D' + Y'$$

$$B' = B'D' + Y'$$

The resulting R' and B' color components are then used along with decompressed luminance Y' to compute (74) the complementary green color component G in accordance with the luminance relationship:

$$G = \frac{Y' - 0.30R' - 0.11B'}{0.59}$$

The color shift compensation operation 80 generates a compensated green color component G' according to:

$$G' = GK_G$$

where $K_G$ is a color-shift compensation factor with a value of around one. That is, because the complementary green color component G is derived from the luminance and chrominance color differences, it can be used to compensate for overall color shift errors introduced by image processing operations that uniformly affect the red and blue color components, and/or luminance component, from which the chrominance color differences (such as result from mathematical round-off errors) are generated. (See Section 5)

The resulting R'G'B' color component data are then available for further image processing and/or image display.

3. Non-Linear Chrominance Range Compression. The non-linear chrominance range compression function of this invention achieves improved visual color perception for a range-compressed color image by taking into account the phenomenon that the eye is much more sensitive to changes in color fidelity caused by subtle color shifts (small color difference magnitudes), than to changes in color fidelity that occur in the regions of saturated colors. The non-linear range compression function avoids or minimizes compression (i.e., a loss of color fidelity) in the range of small color difference magnitudes where color shifts are subtle, gradually increasing compression to a maximum in the saturated color regions where color difference magnitudes are large.

Figure 3A:
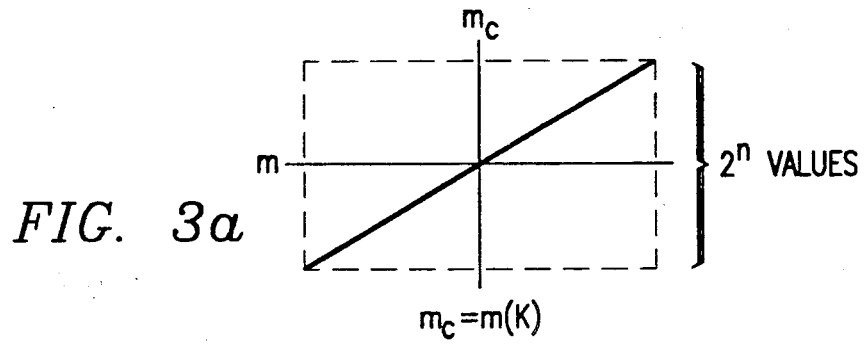
FIGS. 3a and 3b are graphical diagrams of two prior chrominance range compression schemes, and the non-linear chrominance range compression scheme of this invention.
Figure 3B:
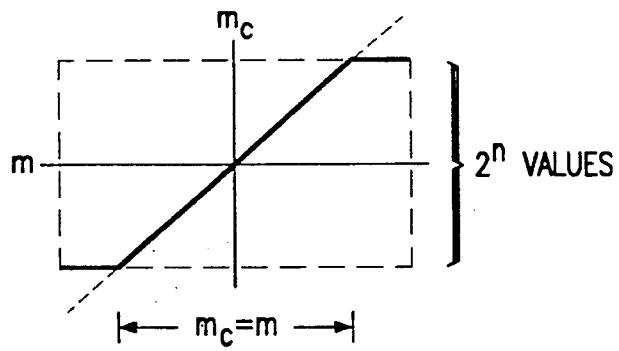
Figure 3C:
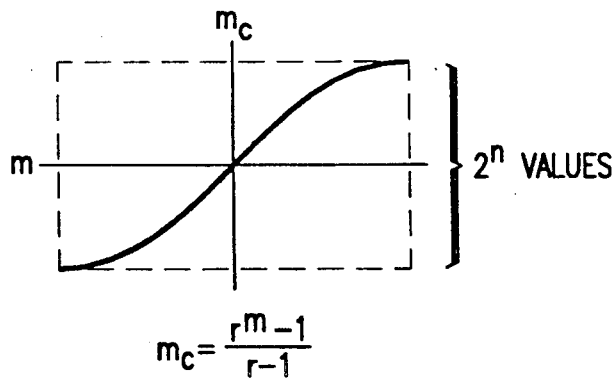

FIGS. 3a–3c illustrate the improvement achieved by the non-linear chrominance range compression function over currently available linear compression functions.

FIG. 3a diagrams a linear compression function in which a chrominance color difference magnitude range greater than $2^n$ is linearly range-compressed into $2^n$ values (i.e., n bits). This linear function can be represented by:

$$m_C = mk$$

where m is the actual color difference magnitude, K is a range compression factor related to the actual and compressed magnitude ranges, and $m_C$ is the compressed color difference magnitude that has a range of $2^n$. As an alternative, FIG. 3b diagrams a truncated linear range compression function in which those color difference magnitudes within the compression range of $2^n$ are uncompressed, while those color difference magnitudes greater than $2^n$ are all assigned the maximum value of $2^n - 1$. This truncated linear range compression function is represented by:

$$M_C = M$$

in the non-truncated range.

The linear range compression function in FIG. 3a provides the same degree of compression (loss in color fidelity) for color shifts throughout the color difference magnitude range. Thus, perceived color fidelity is degraded because the same compression occurs for subtle color shifts (small color difference magnitudes), where the eye is more sensitive to a loss of color fidelity, as occurs in the regions of color saturation (large color difference magnitudes) where the eye is less sensitive. The truncated linear range compression function in FIG. 3b avoids any loss of color fidelity for subtle color shifts at the expense of being unable to maintain color fidelity in the color saturation regions.

In accordance with this invention, FIG. 3c diagrams a non-linear chrominance range compression function That range compression function is given by the sum of a geometrical progression:

$$\frac{r^m - 1}{r - 1}$$

where m is the actual color difference magnitude value, S is an initial compression factor, r is the range compression factor, and $m_C$ is the compressed color difference magnitude value.

The compression/expansion factor S determines the initial slope of the non-linear range compression function. If S is less than one, then chrominance magnitudes will initially be compressed, while if S is greater than one, initial expansion will occur. For the preferred embodiment, S is selected to be one, so that initial chrominance magnitudes are neither compressed nor expanded (i.e., the initial slope of the range compression function in FIG. 3c is one).

For typical magnitude ranges, the range compression factor r is near 1, and for a given S can be derived by substituting the maximum values for $m_C$ and m. For example, if actual color difference magnitudes range up to 227 (the color difference for blue) and must be compressed into a 7-bit magnitude value with a maximum range of 128 ($m_C = 128$), with S equal to one, then r is 0.99435.

The non-linear chrominance range compression function results in zero compression for small color difference magnitudes so that no color fidelity is lost for subtle color shifts. As the actual color difference magnitude increases, compression also increases, causing the range of incremental color difference magnitudes represented by a single increment of the compressed color difference magnitude $m_C$ to increase. Compression reaches a maximum in the regions of color saturation where large color difference magnitudes occur. To illustrate, for the case where the range compression factor r is chosen to be 0.99435, compression does not begin to occur until the actual color difference magnitude reaches a value of 13, while the maximum amount of compression as represented by the incremental range of actual color difference magnitudes covered by the compressed color difference magnitude increment from 127 to 128 is about 4.

The non-linear chrominance range compression function can be implemented either as direct computation, or as a table look-up operation. To reduce computational overhead, and increase image processing rates, the recommended implementation is a table look-up operation. For table look-up, a signed (+ or −) compressed color difference magnitude $m_C$ is computed for each possible signed color difference magnitude m, and then stored in a table for look-up in response to each actual color difference (as represented by the signed R'D/B'D inputs to the non-linear chrominance range compression function 44 in FIG. 1).

Two alternative table look-up implementations can be used. In one implementation, a single table is used that stores compressed color difference magnitudes computed for the color component that yields the maximum range of color difference magnitudes. For the preferred embodiment in which $$Y = 0.30R + 0.59G + 0.11B$$

$$R'D = R' - Y$$

$$B'D = B' - Y$$

using an 8-bit format in which the maximum color component magnitude is 255, the color difference magnitude range for R'D is 178/−179, and the color difference magnitude range for B'D is 226/−227. Accordingly, in this table look-up implementation, the blue color difference B'D yields the largest color difference range, which is compressed in accordance with the non-linear range compression function to a maximum of 256(+/−128), using a range compression factor of about 0.99435. Each of the color differences is assigned a corresponding compressed color difference, and these are stored in a table for look-up during non-linear chrominance range compression. This table of compressed color differences is then used to range-compress both red color differences R'D and blue color differences B'D, although the red color difference has a maximum magnitude of only 179.

While the single table implementation conserves memory space, it also requires more compression for the red color difference magnitudes than is actually required to achieve the desired maximum compressed color difference magnitude (i.e., 128). An alternate table look-up implementation that requires more memory but optimizes color fidelity (minimizes range compression) for both color components uses a separate range compression table for the R'D and B'D color differences. Thus, signed compressed color differences are computed separately for the color differences R'D (using a range of 178/−179 and a range compression factor of about 0.99590) and B'D (using a range of 226/−227 and a range compression factor of about 0.99435), and stored in respective tables. This implementation yields the optimum non-linear range compression function for each color component.

4. Lossy Luminances Compression Compensation. Lossy luminance compression compensation is used to compensate for changes in color caused by lossy luminance compression. Since luminance is derived from the RGB color components according to the NTSC standard:

$$Y = 0.30R + 0.59G + 0.11B$$

any change in luminance, such as resulting from lossy luminance compression, must include a compensating change in the color components to avoid color degradation, which appears as a mottled color image.

The lossy luminance compression compensation function of this invention provides compensated red and blue color component magnitudes R' and B', which are then used to compute chrominance (color differences). The lossy luminance compression compensation function is implemented by computing the difference between compressed and decompressed luminance to obtain a luminance error factor:

$$Y' - Y$$

which is added to the red and blue color component, and any compensated color component magnitudes that fall outside the range of allowable values are limited to that range (i.e., for an 8-bit format, values greater than 256 would be limited to 255):

$$R' = \max[\min[R + (Y' - Y), 255], 0]$$

$$B' = \max[\min[B + (Y' - Y), 255], 0]$$

Thus, the change in luminance represented by the luminance error factor (Y' − Y) is applied equally to the R and B color components, with no compensating change being made to the green color component. The green color component is changed during image decompression, when it is computed from the decompressed luminance and chrominance.

Adding the entire luminance error factor to R and B is recommended, although a percentage of that factor could be used. Thus, the formulas for the red and blue color component magnitudes become:

$$R' = \max[\min[R + d(Y' - Y), 255], 0]$$

$$B' = \max[\min[B + d(Y' - Y), 255], 0]$$

where d is an error factor coefficient.

Because the luminance error factor is applied equally to both R and B, the hue of a pixel that results from the subsequent computation of the green color component during image decompression (using the compensated chrominance color differences R'D and B'D) may be altered. However, any such change in hue will be significantly less than if no lossy luminance compression compensation is performed.

Specifically, the primary affect of the lossy luminance compression compensation function is to change brightness, which is much less perceivable than the change in hue that results when no compensation is performed. That is, the lossy luminance compression compensation technique of this invention causes changes in luminance resulting from lossy compression to be viewed as changes in brightness, rather than changes in color.

The lossy luminance compression compensation function provides significant compensation for color image degradation caused by moderate-to-high luminance compression ratios. While the compensated color component magnitudes R' and B are not precisely accurate, the lossy luminance compression compensation function provided by this invention requires significantly less computation than techniques for providing exact lossy luminance compression compensation.

5. Color Shift Compensation. The color shift compensation function of this invention compensates for overall changes in hue that result from substantially uniform color component changes occurring during image compression processing. The most significant cause of such substantially uniform color shifts is mathematical round-off errors that occur during image compression processing operations, including luminance conversion, lossy luminance compression compensation, chrominance (color difference) computation, and luminance and chrominance compression.

Because these round-off errors typically occur consistently throughout an entire image, the result is an overall shift in the hue of the image. Since the complementary green color component is computed from the red and blue color components, it can be used to compensate for these round-off errors.

Specifically, the color shift compensation function compensates for uniform color shifts by applying a constant color shift factor to the computation of the green color component, so as to cause a shift in the reverse direction of the round-off errors. Thus, the complementary green color component is computed from the red and blue color components $$G = \frac{Y - 0.30R - 0.11B}{0.59}$$

and then a compensated green color component is computed $$G' = GK_G$$

where $K_G$ is a compensation factor of around one (typically within a few percent). The recommended approach is to determine $K_G$ empirically for the compensation algorithm used.

Referring to the RGB color cube in FIG. 4a, a color shift toward magenta is caused by a decrease in luminance and/or an increase in the red and blue color components. This shift may be compensated by boosting the green signal, i.e., by making KG greater than 1.

Referring to the RGB color cube in FIG. 4b, a color shift toward green is caused by an increase in luminance and/or a decrease in the red and blue color components. This color shift may be compensated by reducing the green color component, i.e., by making $K_G$ less than 1.

For the preferred embodiment, round-off errors occurring during image compression processing resulted in a shift toward magenta (FIG. 4a), requiring the color shift compensation function to boost the green signal. A color shift compensation factor $K_G$ of about 1.03 was empirically found to provide optimum color fidelity.

6. Conclusion. The color image processing method of this invention uses a non-linear chrominance range compression function that optimizes color fidelity by minimizing compression for small color difference magnitudes where subtle color shifts are more perceptible, while concentrating range compression in areas of color saturation (large color difference magnitudes) where color shifts are less perceptible. Compensation for lossy luminance compression is accomplished by adding a lossy luminance compression factor (Y'−Y) to the red an blue color components prior to computing chrominance (color differences). Compensation for overall color shift caused by mathematical round-off errors or other substantially uniform color shifts introduced during image compression processing is accomplished by shifting the green color component in the reverse direction of the color shift errors, such that those color shifts are perceived as a change in brightness rather than a change in color.

What is claimed is:

1. A color image processing method for encoding and decoding color images formed by pixels with each pixel being defined by separate color components, comprising the steps:

receiving a color image including color component data for each pixel;

converting the color component data to corresponding luminance and chrominance component data; and range compressing the chrominance data by bit-reduction according to a non-linear range compression function in which, for small chrominance magnitudes, compressed chrominance magnitudes are substantially equal to actual chrominance magnitudes, and for large chrominance magnitudes, the compression of chrominance magnitudes increases to a maximum.

2. The color image processing method of claim 1, wherein the non-linear range compression function is substantially $$m_C = S[r^m - 1]/[r - 1]$$

where m is a chrominance magnitude, S is a compression/expansion factor, r is a range compression factor less than one and greater than zero, and $m_C$ is the resulting compressed chrominance magnitude rounded to the nearest integer.

3. The color image processing method of claim 2, wherein the step of range compressing chrominance is performed by computing the compressed chrominance magnitude $m_C$ for each possible chrominance magnitude m, and storing the $m_C$ values in a table for look-up.

4. The color image processing method of claim 1, wherein chrominance is derived from color differences C−Y, where C is a color component, and Y is luminance.

5. The color image processing method of claim 4, wherein a color image is defined by RGB color components, and wherein the chrominance components are $$RD = R - Y$$

$$BD = B - Y$$

where Y is luminance, R and B are red and blue color components, and RD and BD are corresponding red and blue color differences.

6. The color image processing method of claim 5, wherein chrominance has N magnitude bits, and wherein range compressed chrominance has N−1 magnitude bits.

7. The color image processing method of claim 4, wherein the non-linear range compression function is substantially $$m_C = S[r^m - 1]/[r - 1]$$

where m is a chrominance magnitude, S is a compression/expansion factor, r is a progression factor less than one and greater than zero, and $m_C$ is the resulting compressed chrominance magnitude rounded to the nearest integer.

8. The color image processing method of claim 7, wherein the step of range compressing chrominance is performed by:
- determining the chrominance component that has the largest range;
- computing the compressed chrominance magnitude for each such possible chrominance magnitude; and
- storing the $m_C$ values in a table for look-up in determining all compressed chrominance component magnitudes.

9. The color image processing method of claim 8, wherein the color image is defined by RGB color components, and wherein the chrominance components are $$RD = R - Y$$

$$BD = B - Y$$

where Y is luminance, R and B are red and blue color components, and RD and BD are the corresponding red and blue color differences.

10. The color image processing method of claim 9, wherein chrominance has N magnitude bits, and wherein range compressed chrominance has N−1 magnitude bits.

11. The color image processing method of claim 7, wherein the step of range compressing chrominance is performed by:
- for each chrominance component, calculating the range compressed chrominance magnitude $m_C$ for each possible chrominance magnitude; and
- storing the $m_C$ values in respective tables for look-up in determining the corresponding chrominance component magnitudes.

12. The color image processing method of claim 11, wherein the color image is defined by RGB color components, and wherein the chrominance components are $$RD = R - Y$$

$$BD = B - Y$$

where Y is luminance, R and B are red and blue color components, and RD and BD are red and blue color differences.

13. The color image processing method of claim 12, wherein chrominance has N magnitude bits, and wherein each range compressed chrominance has N−1 magnitude bits.

14. The color image processing method of claim 1, further comprising the step of compressing the luminance data.

15. The color image processing method of claim 14, wherein luminance compression is lossy, and further comprising, prior to the step of range compressing chrominance, the step of compensating for lossy luminance compression by adjusting the color components used to derive chrominance according to a lossy compression compensation function in which the compensated color component magnitude is obtained using a luminance error factor corresponding to the difference between uncompressed and decompressed luminance.

16. The color image processing method of claim 15, wherein the lossy compression compensation function is substantially $$C' = C + d(Y - Y')$$

where C is a color component, d is a percentage weighting factor, Y is uncompressed luminance, Y' is decompressed luminance, and C' is the corresponding compensated color component magnitude.

17. The color image processing method of claim 16, wherein chrominance is derived from color differences $C' - Y'$, where C' is a compensated color component magnitude, and Y' is decompressed luminance.

18. The color image processing method of claim 17, wherein a color image is defined by RGB color components,
wherein the compensated color component magnitudes are given by the lossy compression compensation functions $$R' = R + (Y - Y')$$

$$B' = B + (Y - Y')$$

wherein chrominance is given by the compensated color differences $$R'D = R' - Y'$$

$$B'D = B' - Y'$$

where Y' is decompressed luminance, R' and B' are the compensated red and blue color components, and R'D and B'D are corresponding compensated color differences.

19. The color image processing method of claim 1, further comprising the steps of:
- reconverting luminance and chrominance to corresponding color components; and
- computing a complementary color component using the reconverted color components;
- compensating for color shift caused by errors in the reconverted color components by adjusting the complementary color component according to a color shift compensation function in which the compensated complementary color component is directly proportional to the corresponding uncompensated complementary color component.

20. The color image processing method of claim 19, wherein:
- each pixel is defined by at least three color components, one of which is designated a complementary color component;
- luminance is derived from the color components; and
- chrominance is derived from luminance and the color components other than the complementary color component.

21. The color image processing method of claim 20:
- wherein a color image is defined by RGB color components, with green being designated the complementary color component such that chrominance is derived from luminance and the red and blue color components; and
- wherein the step of compensating for color shift is performed by adjusting the green color component according to the color shift compensation function $$G' = kG$$

where G is the uncompensated green color component, k is a color shift factor around one, and G' is the corresponding compensated green color component.

22. A color image processing method for encoding and decoding color images formed by pixels with each pixel being defined by separate color components, comprising the steps:
- receiving a color image including color component data for each pixel;
- converting the color component data to corresponding luminance and chrominance component data;
- compressing the luminance data using a lossy compression algorithm; and
- compensating for lossy luminance compression by adjusting the color components used to derive chrominance according to a lossy compression compensation function in which the compensated color component magnitude is obtained using a luminance error factor corresponding to the difference between uncompressed and decompressed luminance.

23. The color image processing method of claim 22, wherein the lossy compression compensation function is substantially $$C' = C + d(Y - Y')$$

where C is a color component, d is a weighting factor, Y is uncompressed luminance, Y' is decompressed luminance, and C' is the corresponding compensated color component magnitude.

24. The color image processing method of claim 23, wherein chrominance is derived from compensated color differences $C' - Y'$, where C' is a compensated color component magnitude, and Y' is decompressed luminance.

25. The color image processing method of claim 24:
- wherein a color image is defined by RGB color components,
- wherein the compensated color component magnitudes are given by the lossy compression compensation functions $$R' = R + (Y - Y')$$

$$B' = B + (Y - Y')$$

and
- wherein chrominance is given by the compensated color differences $$R'D = R' - Y'$$

$$B'D = B' - Y'$$

where Y' is decompressed luminance, R' and B' are the compensated red and blue color components, and R'D and B'D are corresponding compensated color differences.

26. The color image processing method of claim 22, further comprising the step of range compressing the chrominance data by bit-reduction according to a non-linear range compression function in which compression is a minimum for small chrominance magnitudes and increases to a maximum for large chrominance magnitudes.

27. The color image processing method of claim 26, wherein, for small chrominance magnitudes, the non-linear range compression function yields compressed chrominance magnitudes that are equal to the actual chrominance magnitude.

28. The color image processing method of claim 29, wherein the non-linear range compression function is substantially $$m_C = S[r^m - 1]/[r - 1]$$

where m is a chrominance magnitude, S is a compression/expansion factor, r is a range compression factor less than one and greater than zero, and $m_C$ is the resulting compressed chrominance magnitude rounded to the nearest integer.

29. The color image processing method of claim 28, wherein the step of range compressing chrominance is performed by computing the compressed chrominance magnitude $m_C$ for each possible chrominance magnitude m, and storing the $m_C$ values in a table for look-up.

30. The color image processing method of claim 29, wherein chrominance has N magnitude bits, and wherein compressed chrominance has N−1 magnitude bits.

31. The color image processing method of claim 29, wherein the step of range compressing chrominance is performed by:
- determining the chrominance component that has the largest range;
- computing the compressed chrominance magnitude $m_C$ for each such possible chrominance magnitude; and
- storing the $m_C$ values in a table for look-up in determining all compressed chrominance magnitudes.

32. The color image processing method of claim 29, wherein the step of range compressing chrominance is performed by:
- for each chrominance component, calculating the compressed chrominance magnitude $m_C$ for each possible chrominance magnitude; and
- storing the $m_C$ values in respective tables for look-up in determining the corresponding chrominance magnitudes.

33. The color image processing method of claim 22, further comprising the steps:
- reconverting the luminance and chrominance components to corresponding color components;
- computing a complementary color component using the reconverted color components; and
- compensating for color shift caused by errors in the reconverted color components by adjusting the complementary color component according to a color shift compensation function in which the compensated complementary color component is directly proportional to the corresponding uncompensated complementary color component.

34. The color image processing method of claim 33, wherein
- each pixel is defined by at least three color components, one of which is designated a complementary color component;
- luminance is derived from the color components
- chrominance is derived from luminance and the color components other than the complementary color component.

35. The color image processing method of claim 34:
- wherein a color image is defined by RGB color components, with green being designated the complementary color component such that chrominance is derived from luminance and the red and blue color components; and wherein the step of compensating for color shift is performed by adjusting the green color component according to the color shift compensation function $$G' = kG$$

where G is the uncompensated green color component, k is a color shift factor about equal to one, and G' is the corresponding compensated green color component.

36. A color image processing method for encoding and decoding color images formed by pixels with each pixel being defined by separate color components, comprising the steps:

receiving a color image including color component data for each pixel;

converting the color component data to corresponding luminance and chrominance component data;

reconverting luminance and chrominance to corresponding color components;

computing a complementary color component using the reconverted color components; and compensating for color shift caused by errors in the reconverted color components by adjusting the complementary color component according to a color shift compensation function in which the compensated complementary color component is directly proportional to the corresponding uncompensated complementary color component.

37. The color image processing method of claim 36, wherein:

each pixel is defined by at least three color components, one of which is designated a complementary color component;

luminance is derived from the color components;

chrominance is derived from luminance and the color components other than the complementary color component.

38. The color image processing method of claim 37:

wherein a color image is defined by RGB color components, with green being designated the complementary color component such that chrominance is derived from luminance and the red and blue color components; and wherein the step of compensating for color shift is performed by adjusting the green color component according to the color shift compensation function $$G' = kG$$

where G is the uncompensated green color component, k is a color shift factor about equal to one, and G' is the corresponding compensated green color component.

39. The color image processing method of claim 36, further comprising the step of range compressing the chrominance data by bit-reduction according to a non-linear range compression function in which compression is a minimum for small chrominance magnitudes and increases to a maximum for large chrominance magnitudes.

40. The color image processing method of claim 39, wherein, for small chrominance magnitudes, the non-linear range compression function yields compressed chrominance magnitudes that are equal to the actual chrominance magnitude.

41. The color image processing method of claim 40, wherein the non-linear range compression function is substantially $$m_C = S[r^m - 1]/[r-1]$$

where m is a chrominance magnitude, S is a compression/expansion factor, r is a range compression factor less than one and greater than zero, and $m_C$ is the resulting compressed chrominance magnitude rounded to the nearest integer.

42. The color image processing method of claim 41, wherein the step of range compressing chrominance is performed by computing the compressed chrominance magnitude $m_C$ for each possible chrominance magnitude m, and storing the $m_C$ values in a table for look-up.

43. The color image processing method of claim 42, wherein chrominance has N magnitude bits, and wherein compressed chrominance has N−1 magnitude bits.

44. The color image processing method of 42, wherein the step of range compressing chrominance is performed by:

determining the chrominance component that has the largest range;

computing the compressed chrominance magnitude $m_C$ for each such possible chrominance magnitude; and storing the $m_C$ values in a table for look-up in determining all compressed chrominance magnitudes.

45. The color image processing method of claim 42, wherein the step of range compressing chrominance is performed by:

for each chrominance component, calculating the compressed chrominance magnitude $m_C$ for each possible chrominance magnitude; and storing the $m_C$ values in respective tables for look-up in determining the corresponding chrominance magnitudes.

46. The color image processing method of claim 36, further comprising the step of compressing the luminance data.

47. The color image processing method of claim 46, wherein luminance compression is lossy, and further comprising, prior to the step of range compressing chrominance, the step of compensating for lossy luminance compression by adjusting the color components used to derive chrominance according to a lossy compression compensation function in which the compensated color component magnitude is obtained using a luminance error factor corresponding to the difference between uncompressed and decompressed luminance.

48. The color image processing method of claim 47, wherein the lossy compression compensation function is substantially $$C' = C + d(Y - Y')$$

where C is a color component, d is a weighting factor, Y is uncompressed luminance, Y' is decompressed luminance, and C' is the corresponding compensated color component magnitude.

49. The color image processing method of claim 48, wherein chrominance is derived from compensated color differences C'−Y', where C' is a compensated color component magnitude, and Y' is decompressed luminance.

50. The color image processing method of claim 49:

wherein a color image is defined by RGB color components, wherein the compensated color component magnitudes are given by the lossy compression compensation functions $$R' = R + (Y - Y')$$

$$B' = B + (Y - Y')$$

and wherein chrominance is given by the compensated color differences $$R'D = R' - Y'$$

$$B'D = B' - Y'$$

where Y' is decompressed luminance, R' and B' are the compensated red and blue color components, and R'D and B'D are corresponding compensated color differences.

* * * * *